(12) United States Patent
Okazaki et al.

(10) Patent No.: US 10,507,454 B2
(45) Date of Patent: Dec. 17, 2019

(54) PHOTOCATALYST MATERIAL AND METHOD FOR PRODUCING SAME

(71) Applicant: Sharp Kabushiki Kaisha, Osaka-shi, Osaka (JP)

(72) Inventors: Shinya Okazaki, Osaka (JP); Hiroyuki Nishinaka, Osaka (JP); Masakazu Matsubayashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 388 days.

(21) Appl. No.: 15/109,455

(22) PCT Filed: Aug. 21, 2014

(86) PCT No.: PCT/JP2014/071929
§ 371 (c)(1),
(2) Date: Jul. 1, 2016

(87) PCT Pub. No.: WO2015/114862
PCT Pub. Date: Aug. 6, 2015

(65) Prior Publication Data
US 2016/0332147 A1 Nov. 17, 2016

(30) Foreign Application Priority Data
Jan. 28, 2014 (JP) ................. 2014-013673

(51) Int. Cl.
*B01J 23/652* (2006.01)
*B01J 35/00* (2006.01)
(Continued)

(52) U.S. Cl.
CPC ......... *B01J 23/6527* (2013.01); *B01J 21/063* (2013.01); *B01J 23/8993* (2013.01);
(Continued)

(58) Field of Classification Search
CPC .. B01J 23/6527; B01J 23/8993; B01J 21/063; B01J 35/0006; B01J 35/04; B01J 37/0244
See application file for complete search history.

(56) References Cited

U.S. PATENT DOCUMENTS
2008/0241542 A1  10/2008  Ohtani et al.

FOREIGN PATENT DOCUMENTS
CN  102872774 A  1/2013
JP  2001-070800 A  3/2001
(Continued)

OTHER PUBLICATIONS
JP 2013208589 (Machine Translation).*
(Continued)

*Primary Examiner* — James A Fiorito
(74) *Attorney, Agent, or Firm* — Keating & Bennett, LLP

(57) ABSTRACT

To provide a photocatalyst material having alkaline resistance and showing less deterioration in photocatalyst performance due to a poisoning effect and to provide a method for producing the photocatalyst material, a photocatalyst material (1A) according to one embodiment of the present invention includes: core particles (2) containing tungsten oxide; a promoter (4) formed on the surface of the core particles (2); and a shell layer (3) made of titanium oxide and covering the entire surface of both the core particles (2) and the promoter (4).

7 Claims, 2 Drawing Sheets

(51) Int. Cl.
B01J 21/06 (2006.01)
B01J 23/89 (2006.01)
B01J 37/02 (2006.01)

(52) U.S. Cl.
CPC ......... B01J 35/004 (2013.01); B01J 35/0006 (2013.01); B01J 37/0244 (2013.01)

(56) References Cited

FOREIGN PATENT DOCUMENTS

| | | | |
|---|---|---|---|
| JP | 2008-149312 A | 7/2008 |
| JP | 2009-160566 A | 7/2009 |
| JP | 2012-110831 A | 6/2012 |
| JP | 2013-208589 A | 10/2013 |

OTHER PUBLICATIONS

Official Communication issued in International Patent Application No. PCT/JP2014/071929, dated Oct. 7, 2014.
S. Shaikh, et al., "Monoclinic WO3 Nanorods-Rutile TiO2 Nanoparticles Core-Shell Interface for Efficient DSSCs+"; Dalton Transactions; vol. 42; May 31, 2013; pp. 10085-10088.
Liu et al., "CdS quantum dots sensitized platelike WO3 photoelectrodes with a TiO2 buffer-layer", Materials Letters vol. 120, Jan. 22, 2014, pp. 170-173.

\* cited by examiner

PHOTOCATALYST MATERIAL AND METHOD FOR PRODUCING SAME

TECHNICAL FIELD

The present invention relates to a photocatalyst material and to a method for producing the same. More particularly, the present invention relates to a visible light responsive photocatalyst material and to a method for producing the same.

BACKGROUND ART

In recent years, attention is being given to photocatalysts that adsorb and decompose environmental pollutants under solar light or indoor light to thereby remove the pollutants and that exhibit a self-cleaning effect on smudges adhering to their surface under solar light or indoor light, and intensive research is being conducted on such photocatalyst materials.

Titanium oxide, which is one of photocatalyst raw materials, has a high photocatalytic effect and is widely studied. However, since the bandgap of titanium oxide is large, it absorbs ultraviolet light but does not absorb visible light. Therefore, although titanium oxide exhibits photocatalytic activity under ultraviolet light, it does not exhibit photocatalytic activity under visible light, so that a photocatalyst material prepared using titanium oxide as a raw material cannot exhibit its photocatalytic effect in an indoor environment in which the amount of ultraviolet light is extremely small.

Accordingly, research and development is being conducted on the photocatalytic effects of photocatalyst materials using raw materials other than titanium oxide, and one of such materials is tungsten oxide. Tungsten oxide has a smaller band gap than titanium oxide and can absorb visible light. However, the photocatalytic activity of tungsten oxide alone is small.

It is generally considered that, when a photocatalyst material is excited, reactive oxygen species are generated by the oxidation reaction of water by holes generated in the valence band and the reduction reaction of oxygen by electrons generated in the conduction band and these reactive oxygen species oxidize and decompose organic materials. However, since the conduction band of tungsten oxide is lower than the redox level of oxygen, electrons do not contribute to the reduction reaction of oxygen but are recombined with holes, and therefore tungsten oxide alone does not exhibit high photocatalytic activity.

PTL 1 and PTL 2 disclose that tungsten oxide particles can be used as a visible light responsive photocatalyst. Specifically, this is achieved by forming an electron-withdrawing material (a promoter) on the surface of the tungsten oxide particles. In this case, the recombination of electrons excited in the conduction band under irradiation with light and holes generated in the valence band is suppressed, so that the photocatalytic activity of the tungsten oxide particles is increased.

PTL 3 discloses a photocatalyst prepared by coating the surface of tungsten oxide with titanium oxide. This photocatalyst has higher photocatalytic action than uncoated tungsten oxide and therefore can rapidly decompose volatile aromatic compounds in a vapor phase.

CITATION LIST

Patent Literature

PTL 1: Japanese Unexamined Patent Application Publication No. 2008-149312 (published on Jul. 3, 2008)

PTL 2: Japanese Unexamined Patent Application Publication No. 2009-160566 (published on Jul. 23, 2009)

PTL 3: Japanese Unexamined Patent Application Publication No. 2012-110831 (published on Jun. 14, 2012)

PTL 4: Japanese Unexamined Patent Application Publication No. 2013-208589 (published on Oct. 10, 2013)

SUMMARY OF INVENTION

Technical Problem

One property of tungsten oxide is that it generally dissolves in an alkaline solution more easily than titanium oxide. Therefore, the photocatalyst materials disclosed in PTL 1 and PTL 2 have a problem in that, when a basic gas such as ammonia is decomposed or when the photocatalyst materials are used in an environment in which they are in contact with a basic detergent, dissolution, degeneration, etc. of the photocatalyst materials occur, so that the desired photocatalytic activity cannot be obtained.

In the photocatalyst material disclosed in PTL 3, the surface of the tungsten oxide is not fully coated with the titanium oxide, and the uncoated portions may be eroded by an alkaline solution. Therefore, the photocatalyst material disclosed in PTL 3 has a problem in that dissolution, degeneration, etc. of the photocatalyst material occur, as in tungsten oxide not covered with titanium oxide.

A photocatalyst coating film disclosed in PTL 4 includes tungsten oxide particles, promoter particles disposed so as to be in contact with the tungsten oxide, and a chemical-resistant coating that is formed of titanium oxide and covers at least surface portions of the tungsten oxide particles that are in contact with air. However, the surface of the promoter particles includes portions not covered with the titanium oxide. Therefore, the photocatalyst coating film has a problem in that, when materials other than water and oxygen are adsorbed on the surface of the promoter, the photocatalyst performance deteriorates (a poisoning effect). For example, platinum, which is a typical promoter material, can be poisoned by carbon monoxide, palladium and copper can be poisoned by sulfur dioxide, and iron can be poisoned by oxygen.

The present invention has been made in view of the foregoing problems, and it is an object to provide a photocatalyst material that has alkaline resistance and shows less deterioration in photocatalyst performance due to the poisoning effect and to provide a method for producing the photocatalyst material.

Solution to Problem

To achieve the above object, a photocatalyst material according to one aspect of the present invention comprises:
core particles containing tungsten oxide;
a promoter formed on the surface of the core particles; and
a shell layer made of titanium oxide and covering the entire surface of both the core particles and the promoter.

To achieve the above object, a method for producing a photocatalyst material according to one aspect the present invention comprises: a formation step of forming a promoter on the surface of core particles containing tungsten oxide; and a covering step of, after the formation step, covering the entire surface of both the core particles and the promoter with a shell layer made of titanium oxide.

Advantageous Effects of Invention

These aspects of the present invention have the following effects. A tungsten oxide-based photocatalyst material having alkaline resistance and showing less deterioration in photocatalyst performance due to the poisoning effect can be provided, and a method for producing the photocatalyst material can also be provided.

DESCRIPTION OF EMBODIMENTS

Embodiment 1

Figure 1:
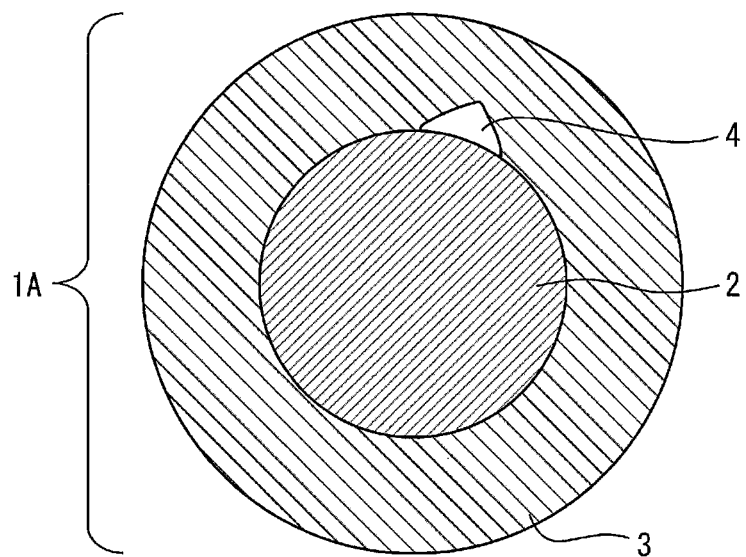
FIG. 1 is a cross-sectional view schematically showing a photocatalyst material according to embodiment 1 of the present invention.

One embodiment of the photocatalyst material according to the present invention will be described with reference to FIG. 1. FIG. 1 is a cross-sectional view schematically showing a photocatalyst material 1A according to embodiment 1.

The photocatalyst material 1A in embodiment 1 includes core particles 2 containing tungsten oxide, a promoter 4 formed on the surface of the core particles 2, and a shell layer 3 made of titanium oxide and covering the entire surface of both the core particles 2 and the promoter 4, 5. The present inventors have conducted extensive studies and found that, by completely covering the core particles containing tungsten oxide with the shell layer made of titanium oxide, the alkaline resistance of the photocatalyst material is significantly improved.

The present inventors have conducted further studies and found that, by forming the promoter 4 on the surface of the core particles 2 and covering the entire surface of both the core particles 2 and the promoter 4 with the shell layer 3, adsorption of poisoning gas on the surface of the promoter 4 is suppressed, whereby the photocatalyst material obtained has high photocatalytic activity.

One structural feature of the photocatalyst material of the present invention is that the surface of the core particles 2 and also the surface of the promoter 4 are covered with the shell layer and are not exposed to the outside.

<Core Particles 2>

The core particles 2 are made of tungsten oxide. Although the core particles 2 in embodiment 1 are made of tungsten oxide, the present invention is not limited thereto. The core particles may contain at least tungsten oxide.

If the diameter of the core particles 2 is less than 5 nm, aggregation occurs, so that it is difficult to form the shell layer 3 on a single (each) core particle. If the diameter of the core particles 2 is more than 100 nm, the photocatalytic activity becomes low. Therefore, the diameter of the core particles 2 is preferably 5 nm to 100 nm.

Examples of the method for producing (the process for preparing) the tungsten oxide forming the core particles 2 include a method in which ammonium paratungstate (APT) is decomposed by heating and a method in which metal tungsten powder is heated in an oxygen atmosphere, and any general method may be used. If the particle size distribution of the tungsten oxide obtained by any of the above methods is wide, tungsten oxide particles with large diameters are removed using an appropriate filter. The thus-obtained tungsten oxide with small particle diameters is used for the production of the photocatalyst material 1A.

The tungsten oxide forming the core particles 2 may be any tungsten oxide such as $WO_3$, $W_{25}O_{73}$, $W_{20}O_{58}$, and $W_{24}O_{68}$, so long as it exhibits photocatalytic activity under irradiation with visible light.

<Promoter 4>

The promoter 4 is made of any metal or metal compound having electron withdrawing ability.

Examples of the metal forming the promoter 4 include copper, platinum, palladium, iron, silver, gold, nickel, ruthenium, iridium, niobium, and molybdenum.

Examples of the metal compound forming the promoter 4 includes chlorides, bromides, iodides, oxides, hydroxides, sulfates, nitrates, carbonates, phosphates, and organic acid salts of the metals for forming the promoter 4.

One example of the method for forming (the process for forming) the promoter 4 on the surface of the core particles 2 is a method in which particles forming the core particles 2 are mixed with metal particles forming the promoter 4 or metal compound particles forming the promoter 4. Another example is a method including: adding particles forming the core particles 2 to a solution containing a metal or metal compound forming the promoter 4; and then heating the obtained solution or irradiating the obtained solution with light to thereby precipitate the metal or metal compound forming the promoter 4 on the surface of the core particles 2.

The amount of the metal or metal compound added to form the promoter 4 is preferably 0.01% by weight to 3% by weight based on the amount of the tungsten oxide forming the core particles 2. If the amount of the metal or metal compound added is less than 0.01% by weight, the promoter effect of the promoter 4 becomes low, so that high photocatalytic activity is not obtained. If the amount of the metal or metal compound added is more than 3% by weight, the amount of the promoter 4 covering the surface of the core particles 2 becomes large. In this case, the area of core particles 2 in contact with air becomes small, so that high photocatalytic activity is also not obtained.

The promoter 4 is formed on the surface of the core particles 2. In this structure, the promoter 4 is not separated from each core particle 2 through the shell layer 3.

<Shell Layer 3>

The shell layer 3 is made of titanium oxide.

If the thickness of the shell layer 3 is less than 1 nm, the surface of the core particles 2 and the surface of the promoter 4 cannot be fully covered. If the thickness of the shell layer 3 is more than 50 nm, the photocatalytic activity of the core particles 2 becomes low. Therefore, the thickness of the shell layer 3 is preferably 1 nm to 50 nm.

One example of the method for covering (the process for covering) the core particles 2 having the promoter 4 formed thereon with the shell layer 3 is as follows. A solution containing a titanium oxide precursor is added to a solution in which the core particles 2 having the promoter 4 formed thereon are dispersed to thereby form a titanium oxide layer on the surface of the tungsten oxide particles, i.e., the core particles 2, and on the surface of the promoter 4 formed on the surface of the tungsten oxide particles.

Another example is a method including: adding the core particles 2 having the promoter 4 formed thereon to a solution containing a titanium oxide precursor; and then volatilizing the solvent in the solution to thereby precipitate a titanium oxide layer on the surface of the tungsten oxide particles, i.e., the core particles 2, and on the surface of the promoter 4 formed on the surface of the tungsten oxide particles. The titanium oxide precursor used above is an alkoxide such as titanium tetraisopropoxide, a complex such as titanium acetylacetonate or titanium lactate, or an aqueous titanium solution such as an aqueous titanium chloride solution or an aqueous titanium sulfate solution.

Preferably, the shell layer 3 is made of crystalline titanium oxide obtained by subjecting the formed shell layer 3 to heat treatment. This is because the crystalline titanium oxide forms a denser shell layer 3 than non-crystalline titanium oxide. Therefore, a photocatalyst material including a shell layer 3 made of crystalline titanium oxide has higher alkaline resistance than a photocatalyst material including a shell layer 3 made of non-crystalline titanium oxide.

Preferably, the crystalline titanium oxide forming the shell layer 3 is one of anatase-type titanium oxide and rutile-type titanium oxide or a mixture thereof. The anatase-type titanium oxide is obtained by heating at a temperature of 400° C. or higher in air. The rutile-type titanium oxide is obtained by heating at a temperature of 900° C. or higher.

<Operational Advantages of Embodiment 1>

The photocatalyst material in embodiment 1 includes the core particles 2 containing tungsten oxide, the promoter 4, 5 formed on the surface of the core particles 2, and the shell layer 3 made of titanium oxide and covering the entire surface of both the core particles 2 and the promoter 4, 5. Therefore, the photocatalyst material in embodiment 1 has higher alkaline resistance than conventional photocatalyst materials in which portions not covered with titanium oxide are present on the surface of tungsten oxide.

Since the shell layer 3 covers not only the core particles 2 but also the promoter 4, 5, the promoter 4, 5 does not adsorb materials other than water and oxygen. PTL 3 describes the formation of a promoter on the surface of cores. However, since the promoter is not fully covered, the surface of the promoter adsorbs materials other than water and oxygen, and this causes a problem in that photocatalyst performance deteriorates (the poisoning effect). For example, platinum, which is a representative promoter material, can be poisoned by carbon monoxide. In addition, palladium and copper, which are promoter materials, can be poisoned by sulfur dioxide, and iron, which is a promoter material, can be poisoned by oxygen. As described above, the conventional photocatalyst materials using tungsten oxide are still materials with low alkaline resistance. Therefore, their applications are limited, and their catalytic performance deteriorates over time due to the poisoning effect. However, in the structure of the photocatalyst material in embodiment 1, the shell layer 3 covers not only the core particles 2 but also the promoter 4, 5. Therefore, a tungsten oxide-based photocatalyst material in which the promoter 4, 5 is not poisoned can be provided.

Embodiment 2

Figure 2:
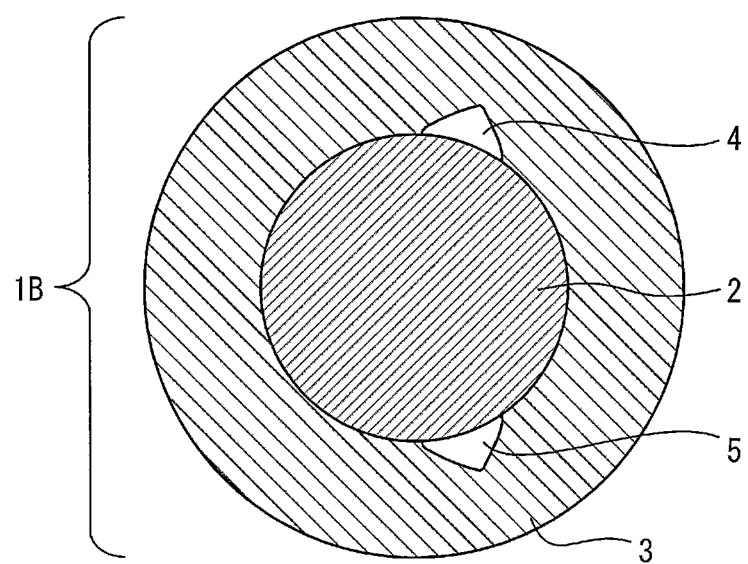
FIG. 2 is a cross-sectional view schematically showing a photocatalyst material according to embodiment 2 of the present invention.

Another embodiment of the present invention will next be described with reference to FIG. 2. FIG. 2 is a cross-sectional view schematically showing a photocatalyst material 1B in embodiment 2. For convenience of description, members having the same functions as those described in embodiment 1 are denoted by the same numerals, and their description will be omitted.

As shown in FIG. 2, the photocatalyst material 1B in embodiment 2 is different from the photocatalyst material 1A in embodiment 1 only in that, in addition to the promoter 4, a promoter 5 of a type different from the promoter 4 is also formed on the surface of the core particles 2.

The promoter 5 of the different type is also made of a metal or a metal compound, as is the promoter 4. Specific examples of the metal and metal compound for the promoter 5 of the different type, the formation method (the formation process) therefor, etc. are the same as those described in embodiment 1.

The promoter 5 of the different type may be formed on the surface of the core particles 2 in a portion on which the promoter 4 is not formed or may be formed so as to overlap the promoter 4.

In the photocatalyst material 1B in embodiment 2, a plurality of types of promoters are formed on the surface of the core particles, so that the promoter effect can be higher than that in the photocatalyst material in embodiment 1.

Embodiment 3

Figure 3:
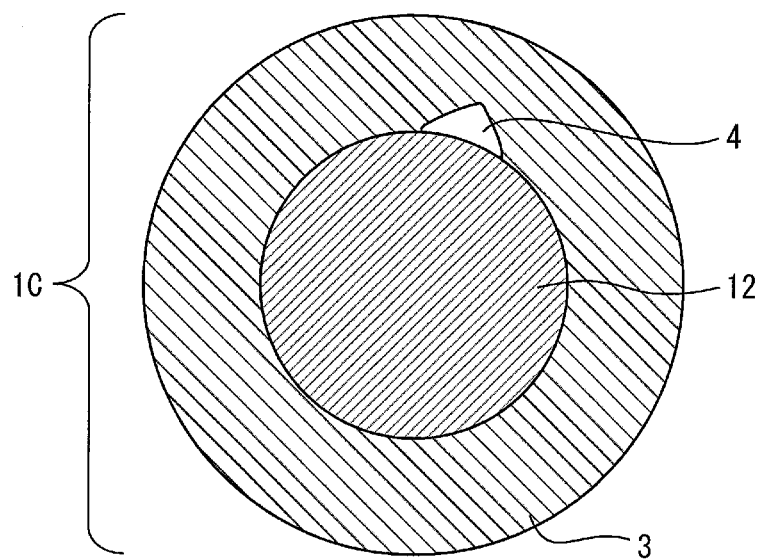
FIG. 3 is a cross-sectional view schematically showing a photocatalyst material according to embodiment 3 of the present invention.

Yet another embodiment of the present invention will next be described with reference to FIG. 3. FIG. 3 is a cross-sectional view schematically showing a photocatalyst material 1C in embodiment 3. For convenience of description, members having the same functions as those described in embodiment 1 are denoted by the same numerals, and their description will be omitted, as in embodiment 2.

As shown in FIG. 3, the photocatalyst material 1C in embodiment 3 is different from the photocatalyst material 1A in embodiment 1 only in that the photocatalyst material 1C includes mixed core particles 12 composed of a mixture of tungsten oxide and copper oxide instead of the core particles 2 included in the photocatalyst material 1A in embodiment 1.

Preferably, the copper oxide included in the mixed core particles is 0.01% by weight or more and less than 100% by weight based on the weight of the tungsten oxide. If the copper oxide is less than 0.01% by weight, the effect of mixing the copper oxide is not obtained. If the copper oxide is more than 100% by weight, the effect of mixing the tungsten oxide is not obtained.

In the mixture of the tungsten oxide and the copper oxide forming the mixed core particles 12, the copper oxide can absorb light in a longer wavelength range than can the tungsten oxide. Specifically, although the absorption edge of the tungsten oxide is about 460 nm, the absorption edge of the copper oxide is in a longer wavelength range, i.e., about 620 nm. Therefore, the mixed core particles 12 can absorb light in a longer wavelength range than can the core particles 2 made of the tungsten oxide alone. In the photocatalyst material 1C according to embodiment 3, the photocatalytic activity of the photocatalyst material 1C under irradiation with visible light can be improved.

Examples of the method for producing the mixture of the tungsten oxide and the copper oxide include: a method in which tungsten oxide particles and copper oxide particles are kneaded; and a method including adding tungsten oxide particles to a copper oxide precursor solution and then volatilizing the solvent in the solution.

The promoter 4 is formed on the produced core particles 5 by any of the methods described in embodiment 1, and then the shell layer 3 is formed, whereby the photocatalyst material 1C is obtained.

In the photocatalyst material 1C in embodiment 3, the core particles include, in addition to tungsten oxide, copper oxide capable of absorbing light in a longer wavelength range than can the tungsten oxide, so that light in a wider wavelength range can be absorbed. Therefore, the photocatalytic activity can be higher than that of the photocatalyst material 1A in embodiment 1.

Embodiment 4

Figure 4:
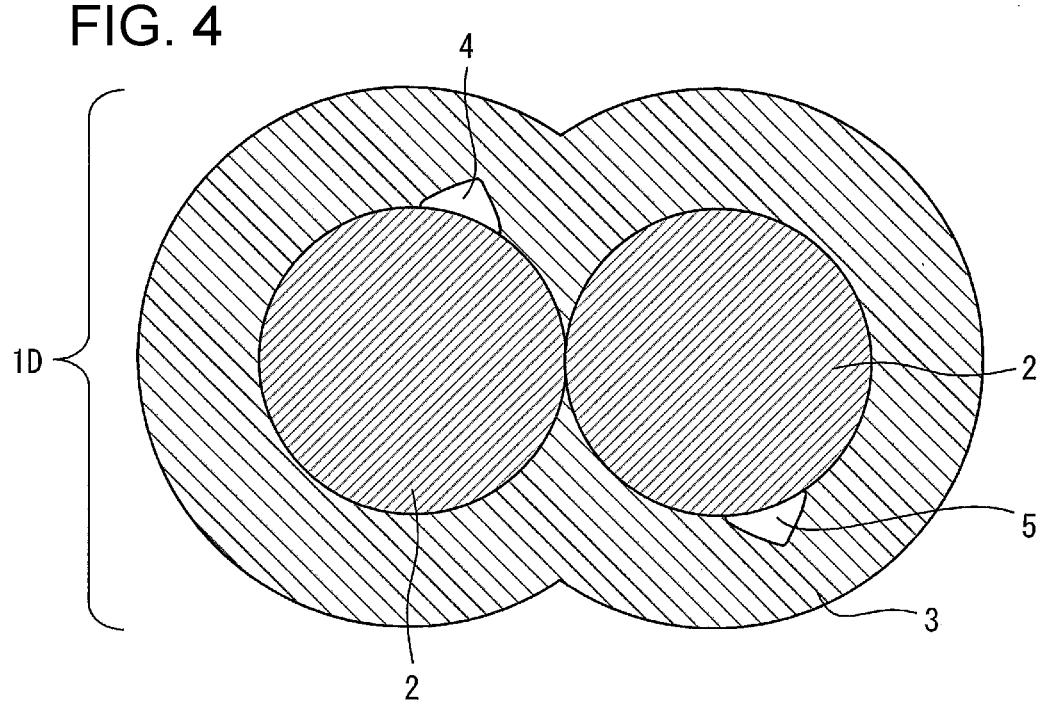
FIG. 4 is a cross-sectional view schematically showing a photocatalyst material according to embodiment 4 of the present invention.

Still another embodiment of the present invention will next be described with reference to FIG. 4. FIG. 4 is a cross-sectional view schematically showing a photocatalyst material 1D in embodiment 4. For convenience of description, members having the same functions as those described in embodiment 1 are denoted by the same numerals, and their description will be omitted, as in embodiments 2 and 3.

As shown in FIG. 4, the photocatalyst material 1D in embodiment 4 is different from the photocatalyst material 1A in embodiment 1 in that each of the core particles 2 comprises a plurality of particles and that a promoter 5 of a type different from the promoter 4 is also formed on the surface of the plurality of core particles. A more specific description will be given with reference to FIG. 4. In the photocatalyst material 1D in embodiment 4, two core particles 2 are covered with a single shell layer 3, and the type of the promoter 4 formed on the surface of one of the core particles 2 is different from the type of the promoter 5 formed on the surface of the other core particle 2.

In the photocatalyst material 1D in embodiment 4, two core particles 2 are adjacent to each other with their surfaces in contact with each other.

Specific examples of the promoters 4 and 5 and the method for forming (the process for forming) them are the same as those described in embodiments 1 and 2.

In the photocatalyst material 1D in embodiment 4, the amount of the promoters supported on the core particles can be larger than that in the photocatalyst material 1B in embodiment 2 in which a plurality of promoters are formed on a single (one) core particle, so that the promoter effect can be further increased.

When two core particles are in contact with each other, as in embodiment 4, a shell that completely covers the two core particles can be easily formed, and this is advantageous. Even when the two core particles are not in contact with each other, the same effect can be obtained when the two core particles are close to each other.

In the photocatalyst material 1D in embodiment 4, two core particles 2 are adjacent to each other with their surfaces in contact with each other, but the present invention is not limited thereto. Two core particles 2 may be adjacent to each other with one of or both the promoters 4 and 5 intervening between the core particles 2.

In the photocatalyst material 1D in embodiment 4, the two core particles 2 are of the same type. However, the two core particles may be of different types. For example, one core particle 2 described in embodiment 1 and one mixed core particle 12 described in embodiment 3 may be covered with a single shell layer as shown in FIG. 4.

[Results of Verification Experiments]

The results of verification experiments for the photocatalyst material according to the present invention will be described.

First, platinum-supporting tungsten oxide particles covered with crystalline titanium oxide (anatase type) were produced. These particles were used as a photocatalyst material of Example 1 and examined. The production method is as follows.

First, 0.4 g of tungsten oxide particles (KISHIDA CHEMICAL Co., Ltd.) serving as core particles were added to 40 mL of ion exchanged water, and ultrasonic waves were applied for 10 minutes to disperse the particles.

Next, to form platinum serving as a promoter on the surface of the tungsten oxide particles, chloroplatinic (IV) acid (KISHIDA CHEMICAL Co., Ltd.) was added to the above-prepared dispersion such that the ratio of the platinum to the tungsten oxide was 0.1% by weight.

The resulting dispersion was heated at 100° C. to evaporate water and then fired at 500° C. for 30 minutes to thereby obtain platinum-supporting tungsten oxide particles.

Next, 0.4 g of the platinum-supporting tungsten oxide particles were added to 40 mL of ion exchanged water, and ultrasonic waves were applied for 10 minutes to disperse the particles.

Next, to form a shell layer made of titanium, 3 mL of an aqueous titanium tetrachloride solution (Toho Titanium Co., Ltd.) with a titanium concentration of 9% by weight was added to the above-prepared dispersion at room temperature under stirring at 500 rpm.

Next, 2 mL of ammonia water (KISHIDA CHEMICAL Co., Ltd.) was added to the dispersion, and the resulting dispersion was stirred at 500 rpm and room temperature for 2 hours.

Next, centrifugation was performed at 9,000 rpm for 10 minutes to separate the powder, and the powder was washed several times with ion exchanged water and heated at 100° C. for 1 hour to dry the powder.

The obtained powder was fired at 500° C. in air for 30 minutes to thereby obtain platinum-supporting tungsten oxide particles covered with crystalline titanium oxide (anatase type) that were used as the photocatalyst material of the present invention in Example 1.

Then the obtained platinum-supporting tungsten oxide particles covered with the crystalline titanium oxide and also platinum-supporting tungsten oxide particles not covered with titanium oxide and used as a photocatalyst material of a Comparative Example were immersed in a 1 mol/L aqueous sodium hydroxide solution for 24 hours. For the photocatalyst material of Example 1, 86% by weight of the particles remained undissolved. For the photocatalyst material of the Comparative Example, 4% by weight of the particles remained undissolved.

The rate constant of decomposition of acetaldehyde under irradiation by a blue LED (wavelength: 450 nm, 7 mW/cm$^2$) was 1.6 [/h] for the photocatalyst material of Example 1 and 1.4 [/h] for the photocatalyst material of the Comparative Example.

The rate constant of decomposition is defined as the magnitude of the gradient of a graph of elapsed time on the horizontal axis against the logarithm of the amount of remaining acetaldehyde on the vertical axis when the change in the amount of remaining acetaldehyde over time is measured.

As can be seen from the above, the tungsten oxide-based photocatalyst material obtained has alkaline resistance and also has excellent photocatalytic activity.

Next, platinum- and palladium-supporting tungsten oxide particles covered with crystalline titanium oxide (anatase type) were produced. These particles were used as a photocatalyst material of Example 2. Its production method is as follows.

First, 0.4 g of tungsten oxide particles (KISHIDA CHEMICAL Co., Ltd.) serving as core particles were added to 40 mL of ion exchanged water, and ultrasonic waves were applied for 10 minutes to disperse the particles.

Next, to form platinum serving as a promoter on the surface of the tungsten oxide particles, chloroplatinic (IV)

acid (KISHIDA CHEMICAL Co., Ltd.) was added to the above-prepared dispersion such that the ratio of the platinum to the tungsten oxide was 0.1% by weight.

Moreover, to form palladium serving as a promoter on the surface of the tungsten oxide particles, a small amount of hydrochloric acid was added to the resulting dispersion, and then palladium chloride (II) was added such that the ratio of the palladium to the tungsten oxide was 0.1% by weight.

The resulting dispersion was heated at 100° C. to evaporate water and then fired at 500° C. for 30 minutes to thereby obtain platinum- and palladium-supporting tungsten oxide particles.

Next, 0.4 g of the platinum- and palladium-supporting tungsten oxide particles were added to 40 mL of ion exchanged water, and ultrasonic waves were applied for 10 minutes to disperse the particles.

Next, to form a shell layer made of titanium, 3 mL of an aqueous titanium tetrachloride solution (Toho Titanium Co., Ltd.) with a titanium concentration of 9% by weight was added to the above-prepared dispersion at room temperature under stirring at 500 rpm.

Next, 2 mL of ammonia water (KISHIDA CHEMICAL Co., Ltd.) was added to the dispersion, and the resulting dispersion was stirred at 500 rpm and room temperature for 2 hours.

Next, centrifugation was performed at 9,000 rpm for 10 minutes to separate the powder, and the powder was washed several times with ion exchanged water and heated at 100° C. for 1 hour to dry the powder.

The obtained powder was fired at 500° C. in air for 30 minutes to thereby obtain platinum- and palladium-supporting tungsten oxide particles covered with crystalline titanium oxide (anatase type) that were used as a photocatalyst material in Example 2.

Then the obtained platinum- and palladium-supporting tungsten oxide particles covered with the crystalline titanium oxide and also the platinum-supporting tungsten oxide particles not covered with titanium oxide and used as the photocatalyst material of the Comparative Example were immersed in a 1 mol/L aqueous sodium hydroxide solution for 24 hours. For the photocatalyst material of Example 2, 85% by weight of the particles remained undissolved. For the photocatalyst material of the Comparative Example, 4% by weight of the particles remained undissolved.

The rate constant of decomposition of acetaldehyde under irradiation by a blue LED (wavelength: 450 nm, 7 mW/cm$^2$) was 1.9 [/h] for the photocatalyst material of Example 1 and 1.4 [/h] for the photocatalyst material of the Comparative Example. The rate constant of decomposition is defined as the magnitude of the gradient of a graph of elapsed time on the horizontal axis against the logarithm of the amount of remaining acetaldehyde on the vertical axis when the change in the amount of remaining acetaldehyde over time is measured.

As can be seen from the above, the tungsten oxide-based photocatalyst material obtained has alkaline resistance and also has excellent photocatalytic activity.

Next, a mixture of platinum-supporting tungsten oxide and copper oxide particles covered with crystalline titanium oxide (anatase type) was produced. The mixture was used as a photocatalyst material of Example 3. Its production method is as follows.

First, 0.4 g of tungsten oxide particles (KISHIDA CHEMICAL Co., Ltd.) serving as core particles and 0.008 g of copper oxide (II) particles (KISHIDA CHEMICAL Co., Ltd.) serving as core particles were added to 40 mL of ion exchanged water, and ultrasonic waves were applied for 10 minutes to disperse the particles.

Next, to form platinum serving as a promoter on the surface of the tungsten oxide particles and the surface of the copper oxide (II) particles, chloroplatinic (IV) acid (KISHIDA CHEMICAL Co., Ltd.) was added to the above-prepared dispersion such that the ratio of the platinum to the tungsten oxide was 0.1% by weight.

The resulting dispersion was heated at 100° C. to evaporate water and then fired at 500° C. for 30 minutes to thereby obtain a mixture of platinum-supporting tungsten oxide and copper oxide particles.

Next, 0.4 g of the mixture of platinum-supporting tungsten oxide and copper oxide particles was added to 40 mL of ion exchanged water, and ultrasonic waves were applied for 10 minutes to disperse the particles.

Next, to form a shell layer made of titanium, 3 mL of an aqueous titanium tetrachloride solution (Toho Titanium Co., Ltd.) with a titanium concentration of 9% by weight was added to the above-prepared dispersion at room temperature under stirring at 500 rpm.

Next, 2 mL of ammonia water (KISHIDA CHEMICAL Co., Ltd.) was added to the dispersion, and the resulting dispersion was stirred at 500 rpm and room temperature for 2 hours.

Next, centrifugation was performed at 9,000 rpm for 10 minutes to separate the powder, and the powder was washed several times with ion exchanged water and heated at 100° C. for 1 hour to dry the powder.

The obtained powder was fired at 500° C. in air for 30 minutes to thereby obtain a mixture of platinum-supporting tungsten oxide and copper oxide particles covered with crystalline titanium oxide (anatase type). The mixture was used as a photocatalyst material of Example 3.

The obtained mixture of the platinum-supporting tungsten oxide and copper oxide particles covered with the crystalline titanium oxide and also the platinum-supporting tungsten oxide particles not covered with titanium oxide and used as the photocatalyst material of the Comparative Example were immersed in a 1 mol/L aqueous sodium hydroxide solution for 24 hours. For the photocatalyst material of Example 3, 82% by weight of the particles remained undissolved. For the photocatalyst material of the Comparative Example, 4% by weight of the particles remained undissolved.

The rate constant of decomposition of acetaldehyde under irradiation by a blue LED (wavelength: 450 nm, 7 mW/cm$^2$) was 1.8 [/h] for the photocatalyst material of Example 3 and 1.4 [/h] for the photocatalyst material of the Comparative Example. The rate constant of decomposition is defined as the magnitude of the gradient of a graph of elapsed time on the horizontal axis against the logarithm of the amount of remaining acetaldehyde on the vertical axis when the change in the amount of remaining acetaldehyde over time is measured.

As can be seen from the above, the tungsten oxide-based photocatalyst material obtained has alkaline resistance and also has excellent photocatalytic activity.

Next, platinum- and palladium-supporting tungsten oxide particles covered with crystalline titanium oxide (anatase type) were produced. These particles were used as a photocatalyst material of Example 4. Its production method is as follows.

First, 0.4 g of tungsten oxide particles (KISHIDA CHEMICAL Co., Ltd.) serving as core particles were added to 40 mL of ion exchanged water, and ultrasonic waves were applied for 10 minutes to disperse the particles.

Next, to form platinum serving as a promoter on the surface of the tungsten oxide particles, chloroplatinic (IV) acid (KISHIDA CHEMICAL Co., Ltd.) was added to the above-prepared dispersion such that the ratio of the platinum to the tungsten oxide was 0.1% by weight.

The resulting dispersion was heated at 100° C. to evaporate water and then fired at 500° C. for 30 minutes to thereby obtain platinum-supporting tungsten oxide particles A.

Next, 0.4 g of additional tungsten oxide particles (KISHIDA CHEMICAL Co., Ltd.) serving as core particles were added to 40 mL of ion exchanged water, and ultrasonic waves were applied for 10 minutes to disperse the particles.

A small amount of hydrochloric acid was added to the above-prepared dispersion. Then, to form palladium serving as a promoter on the surface of the additional tungsten oxide particles, palladium chloride (II) was added such that the ratio of the palladium to the tungsten oxide was 0.1% by weight.

The resulting dispersion was heated at 100° C. to evaporate water and then fired at 500° C. for 30 minutes to thereby obtain palladium-supporting tungsten oxide particles B.

Next, the platinum-supporting tungsten oxide particles A and the palladium-supporting tungsten oxide particles B were kneaded in a mortar to thereby obtained a mixture of the platinum-supporting tungsten oxide particles and the palladium-supporting tungsten oxide particles.

0.4 g of the mixture of the platinum-supporting tungsten oxide particles and the palladium-supporting tungsten oxide particles was added to 40 mL of ion exchanged water, and ultrasonic waves were applied for 10 minutes to disperse the particles.

To cover the mixture with a shell layer made of titanium, 3 mL of an aqueous titanium tetrachloride solution (Toho Titanium Co., Ltd.) with a titanium concentration of 9% by weight was added to the above-prepared dispersion at room temperature under stirring at 500 rpm.

Next, 2 mL of ammonia water (KISHIDA CHEMICAL Co., Ltd.) was added to the dispersion, and the resulting dispersion was stirred at 500 rpm and room temperature for 2 hours.

Next, centrifugation was performed at 9,000 rpm for 10 minutes to separate the powder, and the powder was washed several times with ion exchanged water and heated at 100° C. for 1 hour to dry the powder.

The obtained powder was fired at 500° C. in air for 30 minutes to thereby obtain platinum- and palladium-supporting tungsten oxide particles covered with crystalline titanium oxide (anatase type) that were used as a photocatalyst material in Example 4.

Then the obtained platinum- and palladium-supporting tungsten oxide particles covered with the crystalline titanium oxide and also the platinum-supporting tungsten oxide particles not covered with titanium oxide and used as the photocatalyst material of the Comparative Example were immersed in a 1 mol/L aqueous sodium hydroxide solution for 24 hours. For the photocatalyst material of Example 4, 83% by weight of the particles remained undissolved. For the photocatalyst material of the Comparative Example, 4% by weight of the particles remained undissolved.

The rate constant of decomposition of acetaldehyde under irradiation by a blue LED (wavelength: 450 nm, 7 mW/cm$^2$) was 2.0 [/h] for the photocatalyst material of Example 1 and 1.4 [/h] for the photocatalyst material of the Comparative Example. The rate constant of decomposition is defined as the magnitude of the gradient of a graph of elapsed time on the horizontal axis against the logarithm of the amount of remaining acetaldehyde on the vertical axis when the change in the amount of remaining acetaldehyde over time is measured.

As can be seen from the above, the tungsten oxide-based photocatalyst material obtained has alkaline resistance and also has excellent photocatalytic activity.

SUMMARY

A photocatalyst material according to aspect 1 of the present invention is characterized by including core particles 2 containing tungsten oxide, a promoter 4, 5 formed on the surface of the core particles 2, and a shell layer 3 made of titanium oxide and covering the entire surface of both the core particles 2 and the promoter 4, 5.

In the above structure, since the core particles 2 contain tungsten oxide, the core particles 2 can absorb visible light and show a photocatalytic effect.

Since the promoter 4, 5 is formed on the surface of the tungsten oxide particles, the recombination of electrons excited in the conduction band and holes generated in the valence band under irradiation with light is suppressed. Therefore, the photocatalytic activity of the tungsten oxide particles can be increased, and the photocatalyst material can be used as a visible light responsive photocatalyst material.

Since the entire core particles 2 with the promoter 4, 5 formed on their surface are covered with the shell layer 3, the surface of the core particles 2 may not be eroded by an alkaline solution, and therefore a photocatalyst material with improved alkaline resistance can be obtained.

Since the entire core particles 2 with the promoter 4, 5 formed on their surface are covered with the shell layer 3, the problem of reduction in the photocatalyst performance due to adsorption of materials other than water and oxygen on the surface of the promoter 4, 5 (the poisoning effect) is prevented. Therefore, a tungsten oxide-based photocatalyst material in which the poisoning of the metal or metal compound (the promoter 4, 5) is prevented can be provided.

In a photocatalyst material according to aspect 2 of the present invention, a plurality of types of promoters 4 and 5 may be formed on the surface of the core particles 2 in aspect 1 above.

With this structure, the promoter effect can be higher than that when only one type of promoter is formed on the surface of the core particles.

In a photocatalyst material according to aspect 3 of the present invention, the core particles 2 in aspect 1 or 2 above may be composed a mixture of tungsten oxide and copper oxide.

In this structure, the core particles include, in addition to tungsten oxide, copper oxide that absorbs light in a longer wavelength range than can the tungsten oxide. Therefore, the core particles can show their photocatalyst action while absorbing light in a wider wavelength range.

In a photocatalyst material according to aspect 4 of the present invention, each of the core particles in any of aspects 1 to 3 covered with the shell layer 3 may include a plurality of core particles 2, 2.

In this structure, the amount of the promoter supported on the core particles can be increased, so that the promoter effect can be further increased.

In a photocatalyst material according to aspect 5 of the present invention, a metal or metal compound including at least one of copper, platinum, palladium, iron, silver, gold, nickel, ruthenium, iridium, niobium, and molybdenum may be used for each of the promoters 4 and 5 in any of aspects 1 to 4.

In a photocatalyst material according to aspect 6 of the present invention, the shell layer 3 in any of aspects 1 to 5 may be made of crystalline titanium oxide.

In this structure, the shell layer 3 is made of crystalline titanium oxide. This shell layer 3 can be denser than a shell layer 3 made of non-crystalline titanium oxide. Therefore, a photocatalyst material including the shell layer 3 made of crystalline titanium oxide has higher alkaline resistance than a photocatalyst material including the shell layer 3 made of non-crystalline titanium oxide.

A photocatalyst material production method according to aspect 7 of the present invention includes: a formation step of forming a promoter 4, 5 on the surface of core particles 2 containing tungsten oxide: and a covering step of, after the formation step, covering the entire surface of both the core particles 2 and the promoter 4, 5 with a shell layer 3 made of titanium oxide.

In the photocatalyst material formed by the above production method, the core particles 2 contain tungsten oxide. Therefore, the core particles 2 can absorb visible light and show a photocatalytic effect.

By forming the promoter 4, 5 on the surface of the tungsten oxide particles, the recombination of electrons excited in the conduction band and holes generated in the valence band under irradiation with light is suppressed. Therefore, the photocatalytic activity of the tungsten oxide particles can be increased, and a visible light responsive photocatalyst material can be provided.

Since the entire core particles 2 with the promoter 4, 5 formed on their surface are covered with the shell layer 3, the surface of the core particles 2 may not be eroded by an alkaline solution, so that a photocatalyst material with improved alkaline resistance can be produced.

Since the entire core particles 2 with the promoter 4, 5 formed on their surface are covered with the shell layer 3, the problem of reduction in the photocatalyst performance due to adsorption of materials other than water and oxygen on the surface of the metal or metal compound (the promoter 4, 5) is prevented. Therefore, a tungsten oxide-based photocatalyst material in which the poisoning of the metal or metal compound (the promoter 4, 5) is prevented can be provided.

In a photocatalyst material according to aspect 8 of the present invention, the type of the promoter 4 that is formed on the surface of some of the plurality of core particles 2 in aspect 4 may be different from the type of the promoter 5 that is formed on the surface of other core particles 2. In this structure, the amount of promoters supported on the core particles can be larger than that when a plurality of promoters are formed on one core particle, as in the photocatalyst material 1B in embodiment 2. Therefore, the promoter effect can be further increased.

In a photocatalyst material according to aspect 9 of the present invention, the plurality of core particles in aspect 4 are adjacent to each other with their surfaces in contact with each other or with the promoter 4, 5 intervening between the core particles.

When the surfaces of core particles 2 are in contact with (or close to) each other, the shell layer can be easily formed, and this is advantageous in terms of its production process.

When a promoter intervenes between core particles, the electron withdrawing effect of the promoter can be shared by the core particles, and this is advantageous.

The present invention is not limited to the embodiments described above, and various modifications are possible within the scope shown in the claims. Embodiments obtained by appropriately combining technical means disclosed in different embodiments are also included in the technical scope of the present invention. New technical features can be formed by combining technical means disclosed in the embodiments.

INDUSTRIAL APPLICABILITY

The present invention shows high catalytic activity under visible light and can therefore be used for visible light responsive photocatalytic products. Such a visible light responsive photocatalytic product includes a photocatalyst layer formed of the photocatalyst material of the present invention and disposed on the surface of a base and has the function of adsorbing environmental pollutants and decomposing and removing them under visible light. Specific examples of the visible light responsive photocatalytic products include: construction materials such as ceiling materials, tiles, glass, wall paper, wall materials, and floor materials; interior materials for automobiles; household appliances such as refrigerators and air conditioners; and textile goods such as clothes and curtains.

The photocatalyst material of the present invention has alkaline resistance. Therefore, particularly, the photocatalyst material can be used for photocatalytic products used to decompose basic gases such as ammonia or used in an environment in which the products are in contact with a basic detergent.

REFERENCE SIGNS LIST 1A, 1B, 1C, 1D: photocatalyst material
2: core particle
3: shell layer
4: promoter
5: promoter of different type
12: mixed core particle

The invention claimed is:
1. A photocatalyst material comprising:
core particles including tungsten oxide;
a promoter on a surface of the core particles; and
a shell layer including titanium oxide and covering an entire surface of both the core particles and the promoter such that no portion of the surface of the core particles is exposed to an outside and no portion of the surface of the promoter is exposed to an outside.
2. The photocatalyst material according to claim 1, wherein the promoter on the surface of the core particles includes a plurality of types of promoters.
3. The photocatalyst material according to claim 1, wherein the core particles include a mixture of the tungsten oxide and copper oxide.
4. The photocatalyst material according to claim 1, wherein each of the core particles covered with the shell layer includes a plurality of core particles.
5. The photocatalyst material according to claim 1, wherein the promoter is one of a metal and a metal compound that include at least one of copper, platinum, palladium, iron, silver, gold, nickel, ruthenium, iridium, niobium, and molybdenum.
6. The photocatalyst material according to claim 1, wherein the shell layer includes crystalline titanium oxide.
7. A method for producing a photocatalyst material, the method comprising:
forming a promoter on a surface of core particles that include tungsten oxide; and
after the forming step, covering an entire surface of both the core particles and the promoter with a shell layer that includes titanium oxide such that no portion of the surface of the core particles is exposed to an outside and no portion of the surface of the promoter is exposed to an outside.

* * * * *